US011983525B2

(12) United States Patent
BenHanokh et al.

(10) Patent No.: US 11,983,525 B2
(45) Date of Patent: May 14, 2024

(54) AUTOMATED CONTAINER SIZE REDUCTION

(71) Applicant: Red Hat, Inc., Raleigh, NC (US)

(72) Inventors: Gabriel Zvi BenHanokh, Ra'anana (IL); Orit Wasserman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 36 days.

(21) Appl. No.: 17/851,923

(22) Filed: Jun. 28, 2022

(65) Prior Publication Data
US 2023/0418595 A1    Dec. 28, 2023

(51) Int. Cl.
G06F 8/71     (2018.01)
G06F 8/61     (2018.01)
G06F 9/455    (2018.01)

(52) U.S. Cl.
CPC .......... *G06F 8/71* (2013.01); *G06F 8/63* (2013.01); *G06F 9/455* (2013.01)

(58) Field of Classification Search
None
See application file for complete search history.

(56) References Cited

U.S. PATENT DOCUMENTS

| | | | |
|---|---|---|---|
| 10,169,209 B2 * | 1/2019 | McPherson | G06F 9/45558 |
| 10,379,841 B2 * | 8/2019 | Wong | G06F 8/658 |
| 10,534,671 B1 | 1/2020 | Zhao et al. | |
| 10,810,003 B2 | 10/2020 | Gainsborough et al. | |
| 10,949,237 B2 | 3/2021 | Piwonka et al. | |
| 11,029,975 B2 | 6/2021 | Prasad et al. | |
| 11,579,867 B1 * | 2/2023 | Punathil | G06F 8/71 |
| 2017/0255462 A1 * | 9/2017 | Azagury | G06F 9/30145 |
| 2018/0341471 A1 * | 11/2018 | Stefanov | G06F 8/63 |
| 2020/0409677 A1 * | 12/2020 | Fernandez | G06F 9/455 |
| 2022/0222105 A1 * | 7/2022 | Sedayao | G06F 8/63 |
| 2023/0125342 A1 * | 4/2023 | Krishna | G06F 16/192 |
| | | | 707/639 |
| 2023/0266984 A1 * | 8/2023 | Walsh | G06F 9/545 |
| | | | 718/1 |

FOREIGN PATENT DOCUMENTS

| | | |
|---|---|---|
| CN | 110912955 A | 3/2020 |
| CN | 113703926 B | 11/2021 |

OTHER PUBLICATIONS

Pahl, Claus; "Containerisation and the PaaS Cloud" IEEE Cloud Computing Magazine [In Press—Accepted for Publication, May 6, 2015]; 7 pages.

* cited by examiner

*Primary Examiner* — Marina Lee
(74) *Attorney, Agent, or Firm* — Womble Bond Dickinson (US) LLP (57) ABSTRACT

A container image is received, the container image including a container manifest referencing a first base operating system layer and an application layer. An execution compatibility is determined between the application layer and a second base operating system layer, different from the first operating system layer. An updated container image, an updated container manifest, or the updated container image and the updated container manifest is generated in which the first base operating system layer is replaced with the second base operating system layer.

20 Claims, 6 Drawing Sheets

AUTOMATED CONTAINER SIZE REDUCTION

TECHNICAL FIELD

Aspects of the present disclosure relate to containers, and more particularly, to reducing a size of containers by utilizing common operating system layers.

BACKGROUND

Containers are active components executing on an operating system that provide an environment for applications to run, while being isolated from any other components of a host machine, network, or data center etc. Multiple containers may execute on a single operating system kernel and share the resources of the hardware on which the operating system is running. All of the files, libraries and dependencies necessary to run applications in a container may be provided by an image file(s). An image file may be comprised of a set of base layers that define the runtime environment, as well as the packages and utilities necessary for a containerized application to run.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Containers may provide an isolated set of resources allocated to executing an application, software, and/or process on a host device. The container may execute independently from other applications, software, and/or processes on the host device. The container may share the host operating system (OS) kernel and packages (e.g., libraries, binary files and source files) of the host OS with other containers (or other processes) executing in the host device. All of the files, libraries and dependencies necessary to run applications in a container may be provided by a container image file(s). The container image file may include a base OS layer and an application layer, as well as additional layers which provide other code instructions and/or infrastructure to support the execution of the application layer.

The base OS layer may include a portion of an operating system that supports execution of the application. The base OS layer may, in some cases, differ from the host OS of the host device. In some cases, when executing the container image, the host OS may analyze the layers of the container image to determine if one or more of them are already present on the host OS. If not present, the host OS may retrieve the layer from an image repository. If already present, the host OS may access the currently-present version of the layer rather than downloading the layer again.

In theory, the attempt to reduce downloads for layers already present would reduce an amount of storage space and network traffic utilized to support the execution of a container. In practice, however, the realities of container image development and deployment hinder the full benefits of this feature. In many cases, the developer of the container creates a container image based on whatever environment is used to develop and/or test the container and its associated application. This can result in a wide variety of versions for the various layers of the container image. This can be especially problematic for the base OS layer of the container. There exists a large number of operating systems and versions. For example, in a Linux-based environment, the base OS layer may be one of several Linux distributions (e.g., RED HAT™ UBUNTU™, SUSE™), and for any given distribution, the base OS layer may be one of several versions. In some cases, the host OS may still need to re-acquire a base OS layer of a particular version even if it has previously acquired a different version of the base OS layer for the same OS distribution.

The present disclosure addresses the above-noted and other deficiencies by proactively replacing the base OS layer of a container image with a compatible base OS layer to increase the amount of commonality between containers. The compatible base OS layer may be a smaller OS layer that is nonetheless compatible with the application of the container image. For example, efforts may be made to reduce a size of the compatible base OS layer, focus on its security, and/or reduce any redundancies/inefficiencies in its operation so as to provide an improved OS layer. Replacing the original base OS layer with the compatible base OS layer may reduce a size of the final container image and improve its operating profile without otherwise affecting the operation of the application of the container image.

Moreover, beyond the base OS layer, other layers of the container image may be replaced as well. For example, layers of the container image containing libraries or other runtime support elements may also be replaced. The replacement of the library layers may provide similar benefits with respect to the size and operating profile of the container image as are provided by the replacement of the base OS layer. Some embodiments of the present disclosure may provide systems, methods, and/or computing program products that may automatically (e.g., without manual intervention) convert container images to decrease a storage and/or network burden on the host system.

Figure 1A:
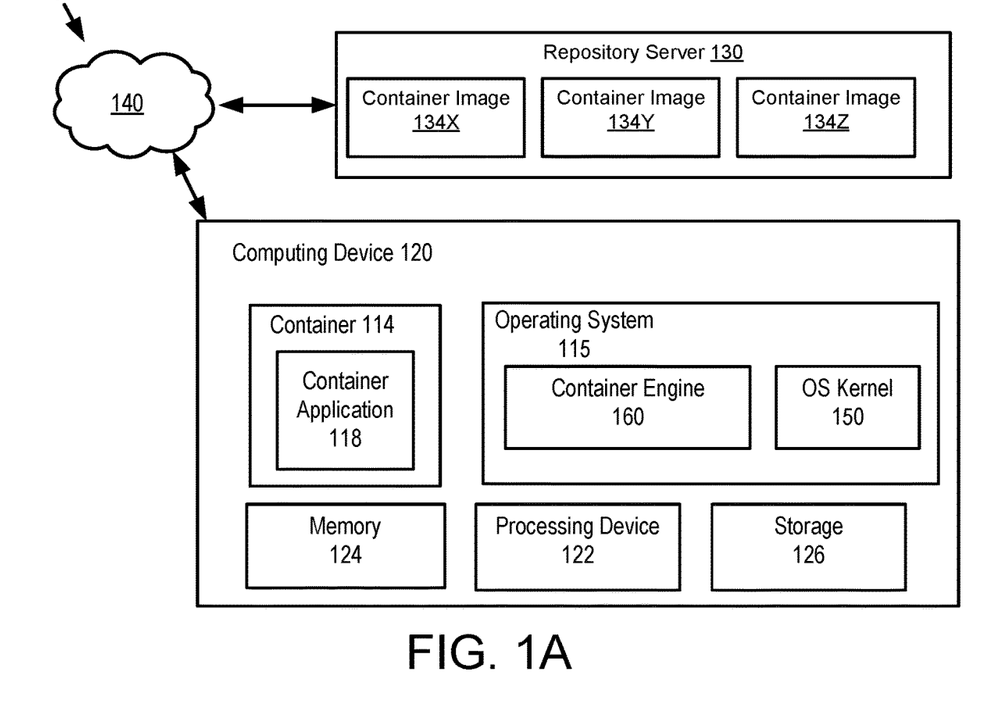
FIG. 1A is a block diagram that illustrates an example system, according to some embodiments of the present disclosure.

FIG. 1A is a block diagram that illustrates an example system 100, according to some embodiments of the present disclosure. FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1A, the system 100 includes a computing device 120 (also referred to herein as host device 120 and host computing device 120), a repository server 130 (also referred to herein as an "image repository"), and a network 140. The computing device 120 and the repository server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WIFI™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and repository server 130.

The computing device 120 (and repository server 130) may include hardware such as processing device 122 (e.g., processors, central processing units (CPUs)), memory 124 (e.g., random access memory (RAM)), storage devices 126 (e.g., hard-disk drive (HDD), solid-state drives (SSD), etc.), and other hardware devices (e.g., sound card, video card, etc.). It should be noted that although, for simplicity, a single processing device 122 is depicted in the computing device 120 depicted in FIG. 1A, other embodiments of the computing device 120 may include multiple processing devices 122, memory 124, storage devices 126, and/or other devices.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The computing device 120 and repository server 130 may comprise any suitable type of computing device or machine that has a programmable processor including, for example, server computers, desktop computers, laptop computers, tablet computers, smartphones, set-top boxes, etc. In some examples, the computing device 120 and repository server 130 may comprise a single machine or may include multiple interconnected machines (e.g., multiple servers configured in a cluster). The computing device 120 and repository server 130 may be implemented by a common entity/organization or may be implemented by different entities/organizations. For example, computing device 120 may be operated by a first company/corporation and repository server 130 may be operated by a second company/corporation. The computing device 120 and repository server 130 may each execute or include an operating system (OS), as discussed in more detail below. The operating systems of computing device 120 and repository server 130 may manage the execution of other components (e.g., software, applications, etc.) and/or may manage access to the hardware (e.g., processors, memory, storage devices etc.) of the computing device 120.

The computing device 120 may execute an operating system 115 (also referred to herein as a "host operating system"). Operating system 115 may be software to provide an interface between the computing hardware (e.g., processing device 122 and/or storage device 126) and applications running on the operating system 115. Operating system 115 may include an OS kernel 150 and a user space supporting the execution of one or more containers 114. Operating system kernel 150 may include several operating system functionalities, including but not limited to process management, hardware interfaces, access control and the like. The OS kernel 150 may execute with an elevated privilege and may manage the administration of the operating system 115. Examples of operating systems 115 include WINDOWS™, LINUX™, ANDROID™, IOS™, and MACOS™.

Repository server 130 may be a server which may store container image files (e.g., container images 134X, 134Y, 134Z), as discussed in further detail herein. Repository server 130 may be accessible by the computing device 120 over the network 140. In some embodiments, the computing device 120 may be capable of downloading one or more of the container images 134, or layers of the container images 134, for execution. As will be described further herein, the container images 134 may provide container applications that may be executed on the computing device 120 to provide one or more services to the computing device 120 (or clients of the computing device 120).

Although FIG. 1A illustrates only a single computing device 120 for ease of illustration and description, computing device 120 may be just one deployment among many within an overarching cloud or on-premises infrastructure that system 100 represents. For example, additional computing devices may be included within system 100 that act as additional deployments.

As illustrated in FIG. 1A, computing device 120 may run a container 114. In some embodiments, the container 114 may be executed based on a container image 134. The container 114 may include a container application 118 (also referred to herein as application 118). Container application 118 may be a desktop application, a network application, a database application, or any other application that may execute within the container 114. In some embodiments, the container 114 may execute on a container engine 160 which executes on the processing device 122 within the host OS 115 of computing device 120. The container engine 160 may allow different containers 114 to share access to the host OS 115 (e.g., the OS kernel 150, packages, binaries, libraries thereof, etc.), and may also perform other functions as discussed in more detail herein. The container 114 may be isolated, in that it is not connected to other processes of computing device 120, whether virtual or otherwise.

In one embodiment, the container engine 160 may allow different containers 114 to share the host OS 115 (e.g., the OS kernel, binaries, libraries, etc.) of the computing device 120. For example, the container engine 160 may multiplex the binaries and/or libraries of the host OS 115 between multiple containers 114. The container engine 160 may also facilitate interactions between the container 114 and the resources of the computing device 120. For example, the container engine 160 may manage requests from container 114 to access a memory 124 (e.g., a RAM) of the computing device 120. In another example, the container engine 160 may manage requests from the container 114 to access certain libraries/binaries of the host OS 115. In other embodiments, the container engine 160 may also be used to create, remove, and manage containers 114. In one embodiment, the container engine 160 may be a component of the host operating system 115 (e.g., Red Hat™ Enterprise Linux). In another embodiment, container engine 160 may run on top of the host operating system 115, or may run directly on host hardware without the use of the host operating system 115.

The container application 118 may execute within the container 114. For example, the container application 118 may execute within a runtime environment provided by the container engine 160. In some embodiments, the container application 118 may be non-native to the host operating system 115. That is to say that the container application 118 may be compiled and/or otherwise built for a different operating system than the host operating system 115. In some embodiments, as will be described further herein, the container 114 may include a layer including code instructions that provide a portion of an operating system that is different than the host operating system 115.

Container engine 160 may provide an image-based deployment module for creating containers 114 and may store one or more image files 134 corresponding to the container 114 (e.g., container images 134) for creating container instances. In some embodiments, the container images 134 may be stored in repository server 130 (e.g., after being generated by a developer or vendor). Each container image 134 may include a series of layers, which may be combined into a single container image 134.

Figure 1B:
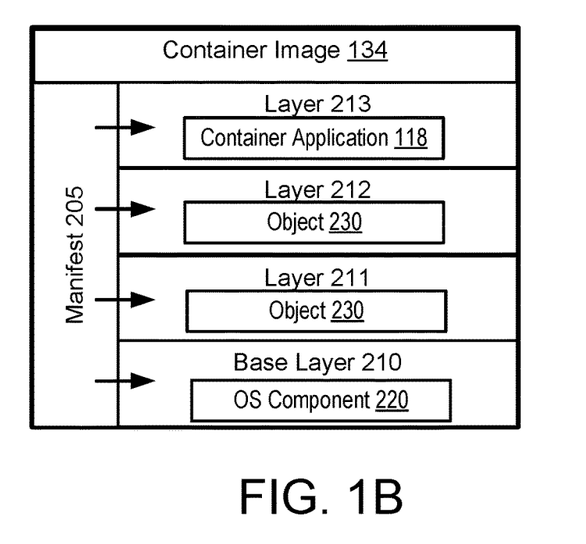
FIG. 1B illustrates an example container image, according to some embodiments of the present disclosure.

FIG. 1B illustrates an example container image 134 from which the container 114 may be generated. The container image 134 may be stored by the container engine 160 or repository server 130 illustrated in FIG. 1A. In some embodiments, as illustrated in FIG. 1B, the container image file 134 may include a base layer 210 (also referred to herein as a base operating system layer) and one or more additional layers 211, 212, 213. Though one base layer 210 and three additional layers 211, 212, 213 are illustrated in FIG. 1B, this is only for the purpose of an example, and the embodiments of the present disclosure are not limited to such a configuration.

When executing a container 114 from a container image 134, one or more of the layers 210, 211, 212, 213 may be loaded into memory (e.g., memory 124 of FIG. 1A). In some embodiments, portions of the container image 134 may be shared by multiple containers 114. In some embodiments, the layers 210, 211, 212, 213 may be read-only within the memory. When the container engine 160 creates a new container 114, it may add a new writable (e.g., in-memory) layers based on the layers 210, 211, 212, 213 of the container image 134. When the container 114 is deleted, the in-memory layers may also be deleted. However, the underlying container image 134 remains unchanged.

An application layer 213 may include the container application 118, while others of the layers (e.g., layers 210, 211, 212) may include infrastructure to support execution of the container application 118. For example, the base layer 210 may include an OS component 220. The OS component 220 may include one or more portions of an operating system that supports a runtime environment as well as the packages and utilities necessary for the container application 118 to run. In some embodiments, the OS component 220 may be different from the host OS 115 (see FIG. 1A) upon which the container 114 is executed.

Other layers may include libraries, support applications, and/or other infrastructure that supports the execution of the container application 118. In the example of FIG. 1B, additional layers 211, 212 may comprise the application infrastructure (including e.g., configuration files and/or software packages supporting the container application 118, including any associated libraries, binary and/or source files, etc.) on which the container application 118 may run. For example, the layers 211, 212 may include objects 230. Objects 230 may include executable code, libraries, configuration files, and the like that may execute on and/or be compatible with the OS component 220.

As an example, the base layer 210 may contain an OS component 220 of a particular version of an operating system, such as Red Hat Enterprise Linux (RHEL) 8.4. Others of the layers 211, 212 may include objects 230 including applications, such as an Apache web server and/or a MySQL database application, each with a particular version. The OS component 220 of the base layer 210 may support execution of the applications and/or instructions of the other layers 211, 212 (e.g., the objects 230). In turn, the container application 118 of the layer 210 may utilize the objects 230 (e.g., a web server and/or a database server) as part of its execution, also supported by the OS component 220 of the base layer 210.

In some embodiments, the OS component 220 of the base layer 210 may include a user-space portion of the operating system 115, separate from the kernel 150, that includes executable instructions configured to interface with the operating system 115 to support execution of the container application 118. As an example, the OS component 220 may include interpreted and/or runtime executable languages like JAVA or PYTHON, as well as user-space portions of filesystems (such as Filesystem in Userspace (FUSE) interfaces and/or Storage Performance Development Kit (SPDK) filesystems).

In some embodiments, the container image 134 may include a container manifest 205. The container manifest 205 may include a reference to each of the layers 210, 211, 212, 213. The container manifest 205 may be used to catalog the contents of the container image 134. In some embodiments, the container manifest 205 may be used when loading the container image 134. For example, the container manifest 205 may be referenced to determine if one or more of the layers 210, 211, 212, 213 has already been loaded in memory (e.g., as part of loading another container image 134).

Referring to FIGS. 1A and 1, the container image 134 may be retrieved from repository server 130 over network 140. For example, the repository server 130 may contain a plurality of container images 134X, 134Y, 134Z. The container images 134X, 134Y, 134Z may include a plurality of different container applications 118 for a plurality of different operating system types. Once selected, the container image 134 may be loaded onto the computing device 120 for execution as container 114.

In some embodiments, as part of loading the container image 134, the layers 210, 211, 212, 213 may be loaded into memory (e.g., memory 124) as read-only images, and in-memory layers which are writeable are generated that refer to the read-only layers 210, 211, 212, 213. Thus, one or more of the layers 210, 211, 212, 213 may be immutable. In some embodiments, the layers 210, 211, 212, 213 of the container image 134 may be individually retrieved from the image repository 130 and/or loaded into memory when a container 114 is executed. For example, when the container image 134 is to be executed, the container image 134 may be analyzed, e.g., by container engine 160, to see if one or more of the layers 210, 211, 212, 213 have been previously loaded (e.g., through the use of the container manifest 205). For example, if the container image 134 contains a first layer 212 that is identical to a first layer 212 that has been previously loaded, the container engine 160 may refer to the previously loaded copy of the first layer 212 rather than downloading the first layer 212 again and/or reloading an additional copy of the layer 212 into memory.

As previously described, the OS component 220 of the container image 134 may be provided to support the application 118, as well as the objects 230 which may be utilized by the application 118. In some cases, the OS component 220 may be taken as a snapshot of a development environment in which the container image 134 was built. Thus, while the OS component 220 may support execution of the application 118, it may not be the only OS component 220 that supports the application 118, but rather the one that was most convenient at the time of the creation of the container image 134.

Because of the wide variations of operating systems and platforms upon which container images 134 are generated, container images may contain a wide variety of OS components 220. As an example, five different container images 134 supporting five different types of applications 118 may include five different types of OS components 220 in their base layers 210. This may occur even though the different applications 118 may all be capable of running on a same OS component 220. That is to say that even though the different applications 118 may all be supported on a same OS version, each of the container images 134 may still contain different OS components 220 in their base layers 210. As an example, this may be due to the differences in the build environments used to create the container images 134.

According to some embodiments of the present disclosure, it may be beneficial to generated an updated container image in which one or more of the layers 210, 211, 212, 213 is modified. For example, the OS component 220 of the base layer 210 may be modified from a first OS component 220A to a second OS component 220B. For example, if a plurality of container images 134 were each modified to include a base layer 210 having the same second OS component 220B, a number of advantages could be realized.

For example, as discussed above, if a plurality of container images 134 each have a same base layer 210, the container engine 160 may be able to omit downloading the base layer 210 from the image repository 130 and/or loading the base layer 210 into memory and, instead, refer to a previously downloaded and/or loaded copy of the base layer 210. In addition, in some embodiments, the updated base layer 210 may be a base layer 210 in which additional effort has been made to make the base layer 210 smaller, more efficient, and/or more secure. This may allow a plurality of first base OS layers 210A to be replaced with an improved second base layer 210.

Figure 2:
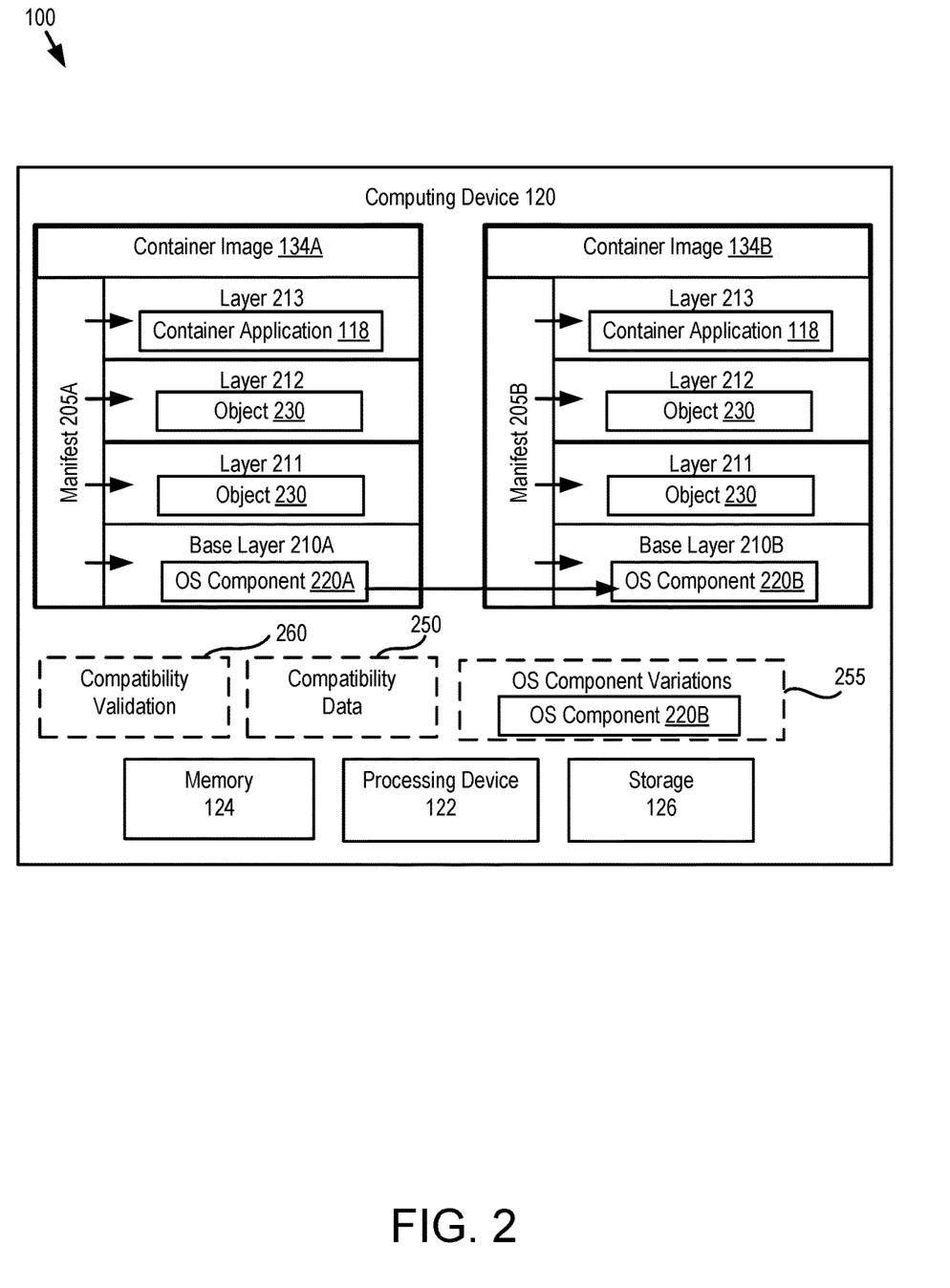
FIG. 2 is a schematic diagram of system that provides additional details regarding the modification of a layer of a container image, according to some embodiments of the present disclosure.

FIG. 2 is a schematic diagram of system 100 that provides additional details regarding the modification of a base layer 210 of a container image 134, according to some embodiments of the present disclosure. A descriptions of elements of FIG. 2 that have been described with respect to previous figures will be omitted for brevity. In FIG. 2, as well as in other portions of the description herein, the discussion will focus on the replacement of the base layer 210 (see FIG. 1B). However, embodiments of the present disclosure are not limited thereto. In some embodiments, other layers (e.g., layers 211, 212 of FIG. 1B) may be replaced according to operations described herein with respect to the base layer 210 without deviating from the embodiments of the present disclosure.

Referring to FIG. 2, the computing device 120 may include memory 124, processing device 122, and storage 126, as described herein. In FIG. 2, the processing device 122 may execute instructions to generate an updated container image 134B from a first container image 134A. In the embodiments illustrated in FIG. 2, the container images 134 are structured similar to that of FIG. 1B for ease of description, but the container images 134 may vary from those of FIG. 2 without deviating from the embodiments of the present disclosure.

A first container image 134A may be received at the computing device 120. The first container image 134A may, for example, be downloaded from an image repository such as image repository 130 of FIG. 1A. The first container image 134A may contain a first layer 213 (e.g., an application layer 213) that includes a container application 118. The container application 118 may include, for example, an executable application configured to perform and/or provide one or more services on the computing device 120. The container application 118 may include, for example, executable instructions configured to be executed by processing device 122. For example, the container application 118 may be configured to be loaded by a container engine 160 to provide an executing software container 114 (see FIG. 1A).

In some embodiments, the container application 118 may utilize one or more objects 230 as part of its execution. For example, objects 230 may be executable instructions (e.g., configured to be executed by processing device 122) that provide one or more services utilized by container application 118. The objects 230 may be provided as part of second layer 212 and/or third layer 211 of the first container image 134A. The second layer 212 and the third layer 211 may provide the functionality relied upon by the container application 118 such that the container application 118 may be capable of running self-contained without relying on services provided by other parts of the computing device 120 (e.g., outside the first container image 134A).

The first container image 134A may include a first base OS layer 210A. The first base OS layer 210A may provide a first OS component 220A. For example, the first OS component 220A may include a portion of an operating system that supports the execution of the objects 230 of the second and third layers 212, 211 of the first container image 134A as well as the container application 118 of the first layer 213 (also referred to as an application layer 213) of the first container image 134A. In some embodiments, the first OS component 220A may be a different operating system and/or a different operating system version and the host operating system 115 (see FIG. 1A).

The first container image 134A may include a first container manifest 205A. The first container manifest 205A may include references to each of the layers of the first container image 134. For example, the first container manifest 205A may include a reference to the first layer 213, the second layer 212, the third layer 211, and/or the first base OS layer 210A.

Upon receiving the first container image 134A, the various layers 210, 211, 211, 213 of the first container image 134A may be analyzed by a compatibility validation component 260. The compatibility validation component 260 may include, for example, executable instructions that are executed by processing device 122. For example, the contents of the various layers 210, 211, 211, 213 may be analyzed by the compatibility validation component 260 to determine compatibility of the various contents with an OS component that is different than the first OS component 220A of the first container image 134A.

In some embodiments, the first container image 134A may be analyzed by the compatibility validation component 260 to determine if the application layer 213 containing the container application 118 is compatible (e.g., has an execution compatibility) with a second base OS layer 210B that is different than the first base OS layer 210A. Determining that the container application 118 is has an execution compatibility with a second base OS layer 210B may include determining that each of the application layer 213, as well as the other layers 211, 212, of the first container image 134A will execute successfully and without error when combined with the second base OS layer 210B. Execution compatibility may include confirming that particular application programming interfaces (APIs) utilized by the application layer 213 and/or application 118 are present in the second base OS layer 210B and accept the identical number and types of inputs. First example, the processing device 122 may determine if the container application 118 is compatible with a second OS component 220B of the second base OS layer 210B that is different from the first OS component 220A. To determine if the application layer 213 and/or container application 118 is compatible with the second base OS layer 210B and/or the second OS component 220B, compatibility data 250 may be analyzed. Compatibility data 250 may include data that maps particular versions of the container application 118 to a particular version of one or more OS component variations 255. For example, the compatibility data 250 may include a mapping between the container application 118 and one or more OS components 220 of the OS component variations 255. Because the container application 118 may be compatible with more OS components 220 than just the first OS component 220A of the first container image 134A, the first OS component 220A may be capable of being replaced without affecting an operation of the container application 118.

In some embodiments, compatibility data 250 may not be available for the container application 118. For example, the container application 118 may be a custom application for which compatibility data 250 are not available. In such instance, an assumption may be made that if the underlying objects 230 of the layers 212, 211 that support the first layer 213 of the container application 118 are compatible with the second base OS layer 210B and/or the second OS component 220B, then the container application 118 is also compatible with the second base OS layer 210B and/or the second OS component 220B. For example, the objects 230 of the supporting layers 212, 211 may be applications (e.g., web servers, databases, etc.) may be more commonly available for examination and may thus be more amenable to developing compatibility data 250.

Thus, in some embodiments, the objects 230 of the layers 211, 212 of the first container image 134A may be examined for compatibility with additional OS components 220 of the OS component variations 255. In some embodiments, based on the compatibility of the objects 230 (e.g., as determined by the compatibility data 250) of the first container image 134A, a second OS component 220B and/or second base OS layer 210B may be selected that is determined to be compatible with the container application 118 and/or the application layer 213.

In some embodiments, the compatibility data 250 may be determined by experimentation. For example, different ones of the objects 230 may be executed on different OS components 220 of the OS component variations 255 to determine compatibility. A runtime environment may be created and the objects 230 may be executed (e.g., by processing device 122) to determine if the execution passes (e.g., the object 230 runs successfully) or fails (e.g., crashes or otherwise generates an error). In some embodiments, a successful execution of the object 230 may be saved into compatibility data 250 for future use.

In some embodiments, the compatibility data 250 may be automatically generated. For example, the first OS component 220A may be selectively replaced with one of the OS components 220 of the OS component variations 255 to form a modified container image 134, and the modified container image 134 may be executed and monitored. If the modified container image 134 does not crash or otherwise generate an error, the compatibility data 250 may be updated to record that the particular OS component 220 is compatible with the objects 230 and/or container application 118 of the container image 134.

In some embodiments, the compatibility data 250 may be optional. Instead, compatibility information may be stored within the container image 134 itself. For example, metadata and/or tags may be applied to one or more of the layers 211, 212, 213 to indicate which OS component variations 255 are compatible with the given layer. Upon examination of the first container image 134A, the compatibility validation component 260 may scan or otherwise examine the metadata of the layer 211, 212, 213 to determine a base layer 210 and/or OS component 220 that is compatible with the layer 211, 212, 213. As an example, the application layer 213 of the first container image 134A may contain metadata indicating that, in addition to the first base OS layer 210A, the application layer 213 of the first container image 134A is also compatible with a second base OS layer 210B and/or a second OS component 220B. From this metadata, the compatibility validation component 260 may determine that the application layer 213 of the first container image 134A is compatible with the second base OS layer 210B.

Responsive to determining that the container application 118 and/or application layer 213 is compatible with a second base OS layer 210B and/or a second OS component 220B of the OS component variations 255, a second container image 134B and/or a second container manifest 205B may be generated. Some layers of the second container image 134B may be identical to some layers of the first container image 134A. In some embodiments, only the base layer 210 containing the first OS component 220A may be modified, though the embodiments of the present disclosure are not limited thereto. For example, the first OS component 220A of a first base OS layer 210A of the first container image 134A may be replaced with the second OS component 220B to form a second base OS layer 210B of the second container image 134B. That is to say that the first OS component 220A may be swapped with the second OS component 220B to form an updated second container image 134B.

In some embodiments, the second OS component 220B may be a universal base image (UBI) provided by Red Hat Enterprise Linux. A UBI provides a base image that includes portions of the operating system runtime languages, and/or complementary packages that can be used for execution of container application 118. The UBI may provide a reduced set of executables and/or infrastructure to support container application 118.

As discussed herein, by replacing the first OS component 220A and/or the first base OS layer 210A with a second, compatible, OS component 220B and/or second base OS layer 210B, the size of the second container image 134B may be reduced from that of the first container image 134A. In addition, an execution speed and/or efficiency of a container 114 executed from the second container image 134B may be increased and an amount of memory utilized may be decreased as compared to a container 114 executed from the first container image 134A. For example, by utilizing an updated OS layer 210B, the resulting second container image 134B may utilize a base layer 210 that is common with other executing containers 114 on the computing device 120. As a result, an amount of data that is downloaded from an image repository 130 and/or loaded into memory may be reduced. In some embodiments, the replacement of the first OS component 220A with the second OS component 220B may be performed without requiring additional input from the creator and/or developer of the first container image 134A.

In some embodiments, as part of generating the second container image 134B, a second container manifest 205B may be generated. The second container manifest 205B of the second container image 134B may differ from the first container manifest 205A of the first container image 134A at least in that the second container manifest 205B may contain a reference to the second base OS layer 210B including the second OS component 220B rather than a reference to the first base OS layer 210A including the first OS component 220A.

Though FIG. 2 focuses on the replacement of the base layer 210, it will be understood that other ones of the layers, such as layer 211 and/or layer 212, containing objects 230, may be similarly replaced. For example, layer 211 may be analyzed to determine if it may be replaced other layers (and/or objects 230) that are compatible with the application 118 and/or base layer 210. For example, it may be determined that layer 211 contains executable code for a particular version of a web server, and the layer 211 may be replaced with another layer that provides a different version of the web server.

Figure 3:
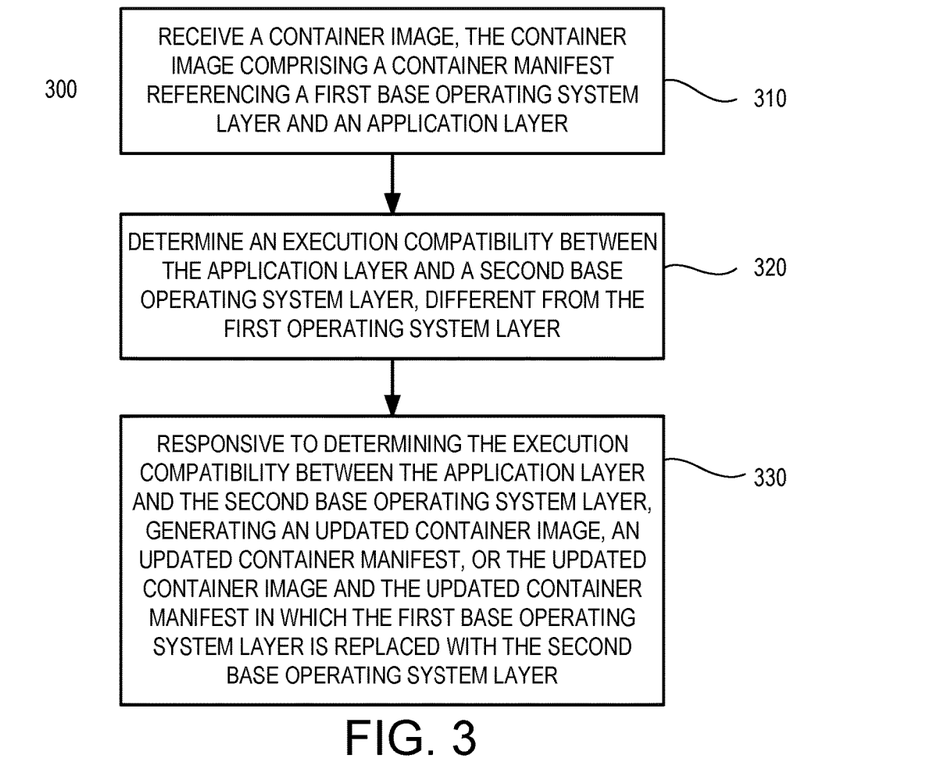
FIG. 3 is a flow diagram of a method for replacing a layer of a container image, in accordance with some embodiments of the present disclosure

FIG. 3 is a flow diagram of a method 300 for replacing a layer of a container image 134, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 120 illustrated in FIGS. 1A and 2).

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring simultaneously to FIG. 2 as well, the method 300 begins at block 310, in which a container image 134A is received, the container image 134A comprising a container manifest 205A referencing a first base operating system layer 210A and an application layer 213. In some embodiments, the container image 314A comprises a plurality of layers, one of which is the first base operating system layer 210A. In some embodiments, receiving the container image 134A comprises downloading the container image 134A from an image repository 130.

At block 320, an execution compatibility is determined between the application layer 213 and a second base operating system layer 210B, different from the first operating system layer 210A. In some embodiments, the first base operating system layer 210A comprises a first operating system component 220A that is different from a second operating system component 220B of the second base operating system layer 210B. In some embodiments, determining the execution compatibility between the application layer 213 and the second base operating system layer 210B comprises examining metadata of one or more of the plurality of layers. In some embodiments, determining the execution compatibility between the application layer 213 and the second base operating system layer 210B comprises determining that the application layer 213 will execute successfully and without error when combined with the second base operating system layer 210B.

In some embodiments, determining the execution compatibility between the application layer 213 and the second base operating system layer 210B is performed upon the container image 134A at an image repository 130 of a plurality of container images 134, is performed upon the container image 134A responsive to downloading the container image 134A from the image repository 130, or is performed when building the container image 134A.

At block 330, responsive to determining the execution compatibility between the application layer 213 and the second base operating system layer 210B, an updated container image 134B, an updated container manifest 205B, or the updated container image 134B and the updated container manifest 205B is generated in which the first base operating system layer 210A is replaced with the second base operating system layer 210B.

Figure 4:
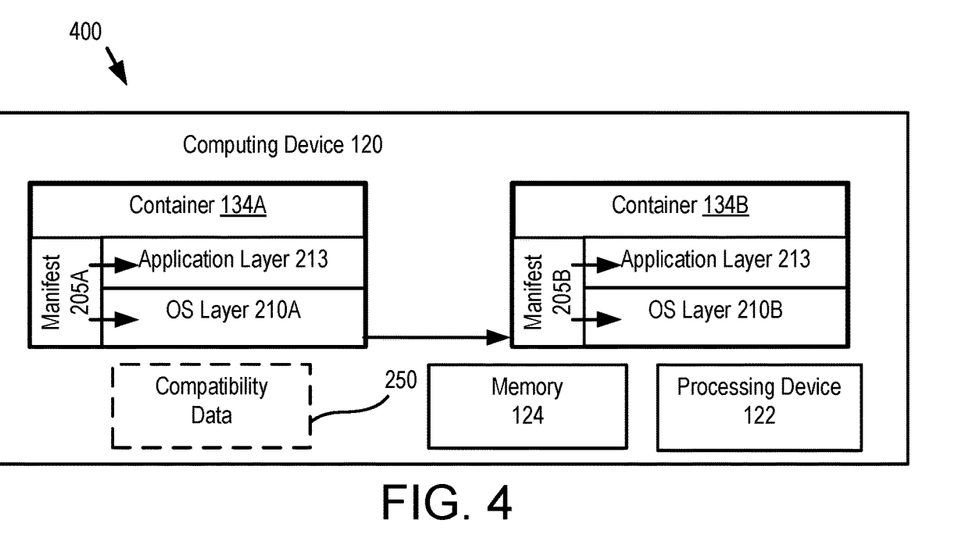
FIG. 4 is a component diagram of an example of a device architecture, in accordance with embodiments of the disclosure.

FIG. 4 is a component diagram of an example of a device architecture 400, in accordance with embodiments of the disclosure. The device architecture 400 includes computing device 120 having processing device 122 and memory 124, as described herein with respect to FIGS. 1A and 3.

The computing device 120 may receive a container image 134A containing a container manifest 205A referencing a first base OS layer 210A and an application layer 213. The computing device 120 (e.g., through operation of processing device 122) may determine an execution compatibility between the application layer 213 and a second base OS layer 210B, that is different from the first base OS layer 210A, as described herein with respect to FIGS. 1A to 3. An updated container image 134B, an updated container manifest 205B, or the updated container image 134B and the updated container manifest 205B may be generated in which the first base OS layer 210A is replaced with the second base OS layer 210B, as described herein with respect to FIGS. 1A to 3.

The device architecture 400 of FIG. 4 provides an ability replace the first base OS layer 210A with another, different, second base OS layer 210B, that remains compatible with the application 118 of the application layer 213. The second base OS layer 210 may be a UBI image that provides a reduced memory footprint and potentially more efficient execution. The device architecture 400 allows for a mechanism to retroactively replace a base OS layer 210 without affecting the compatibility of the application layer 213.

The embodiments described herein to determine an intra-compatibility between one or more layers of a container image 134 may be performed in a number of different scenarios. FIGS. 5A to 5D are schematic diagrams illustrating examples of generating updated container images 134, according to some embodiments of the present disclosure. A description of elements of FIGS. 5A, 5B, 5C, and 5D that have been previously provided will not be repeated here for brevity.

Figure 5A:
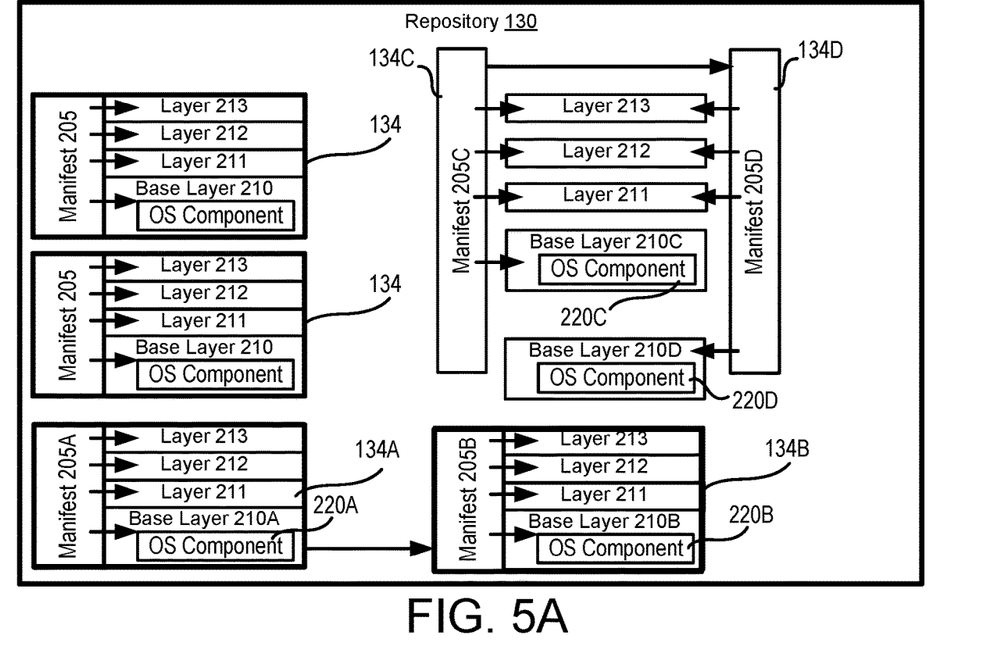
FIGS. 5A to 5D are schematic diagrams illustrating examples of generating updated container images, according to some embodiments of the present disclosure.

Referring to FIG. 5A, in some embodiments the contents of an image repository 130 can be scanned, and one or more of the container images 134 of the repository may be modified in situ. For example, the container images 134 may be analyzed to determine if an application layer (e.g., layer 213) is compatible with different layers than those present in the first container image 134A such that the layers can be replaced. For example, it may be determined that a first container image 134A has a first base OS layer 210A and an application layer 213. The first base OS layer 210A may include a first OS component 220A. It may be further determined that the application layer 213 is compatible with a second base OS layer 210B that is different than the first base OS layer 210A. The second base OS layer 210B may include a second OS component 220B. In some embodiments, determining that the second base OS layer 210B is compatible with the application layer 213 may include determining that each of the layers 213, 212, 211 of the first container image 134A will run successfully and without error when combined with the second base OS layer 210B.

Responsive to this determination, a second container image 134B may be generated in which the first base OS layer 210A is replaced with the second base OS layer 210B. In some embodiments, the second container image 134B may replace the first container image 134A (e.g., the first container image 134A may be removed from the image repository 130), but the embodiments of the present disclosure are not limited thereto. In some embodiments, both the first container image 134A and the second container image 134B may remain on the image repository 130. In some embodiments, as part of generating the second container image 134B, a second container manifest 205B may be generated from a first container manifest 205A of the first container image 134A. The second container manifest 205B may reference the second base OS layer 210B.

FIG. 5A also illustrates an embodiment in which container images 134 are manipulated additionally by their container manifests 205. For example, as illustrated in FIG. 5A, a third container image 134C may be uploaded that contains layers 211, 212, 213, as well as a third base OS layer 210C containing a third OS component 220C. When the third container image 134C is uploaded to the image repository 130, the container manifest 205C of the third container image 134C may be examined to determine if the layers 210C, 211, 212, 213, are already present on the image repository 130. If already present, the image repository 130 may optionally skip uploading the layers 210C, 211, 212, 213 and only upload the container manifest 205C of the third container image 134C. In this way, the image repository may save storage space.

In such an embodiment, as part of generating a fourth container image 134D from the third container image 134C, the third base OS layer 210C may be replaced with a fourth base OS layer 210D. This may be accomplished by generating a fourth container manifest 205D from the third container manifest 205C that references the fourth base OS layer 210D (e.g., rather than the third base OS layer 210C). In this way the fourth container image 134D may be generated by generating an updated fourth container manifest 205D.

Though the following examples illustrate embodiments where the container images 134 contain all of the references layers, it will be understood that similar embodiments are possible in which the container images 134 are manipulated based on the container manifests 205 that reference separately stored layers, and the updated container images 134 may be formed by altering the container manifests 205.

Figure 5B:
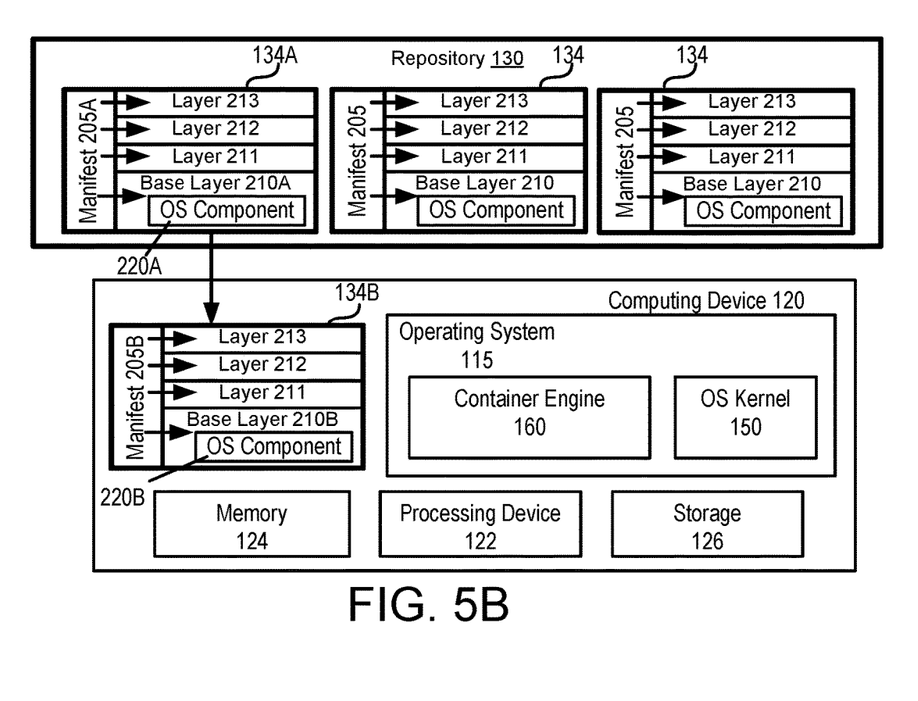

Referring to FIG. 5B, in some embodiments a first container image 134A of the repository may be modified when the first container image 134A is downloaded (e.g., over network 140 of FIG. 1A) for execution on a computing device 120. For example, after receiving the first container image 134A from the image repository 130, the first container image 134A may be analyzed to determine if an application layer (e.g., layer 213) is compatible with different layers than those present in the first container image 134A such that the layers can be replaced. For example, it may be determined that the first container image 134A has a first base OS layer 210A and an application layer 213. The first base OS layer 210A may include a first OS component 220A. It may be further determined that the application layer 213 is compatible with a second base OS layer 210B that is different than the first base OS layer 210A. The second base OS layer 210B may include a second OS component 220B. In some embodiments, determining that the second base OS layer 210B is compatible with the application layer 213 may include determining that each of the layers 213, 212, 211 of the first container image 134A will run successfully and without error when combined with the second base OS layer 210B.

Responsive to this determination, a second container image 134B may be generated in which the first base OS layer 210A is replaced with the second base OS layer 210B. In some embodiments, the second container image 134B may be generated prior to the execution of the first container image 134A (e.g., by the container engine 160). In some embodiments, the second container image 134B and/or the first container image 134A may be stored on the computing device 120 (e.g., within storage 126).

Figure 5C:
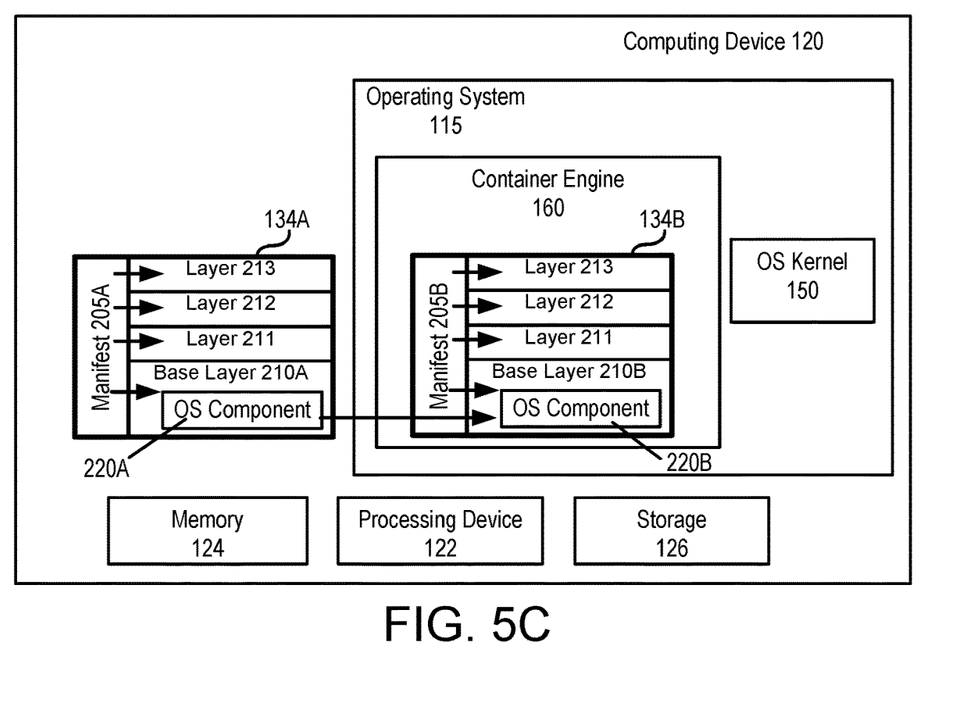

Referring to FIG. 5C, in some embodiments a first container image 134A may be modified when the first container image 134A is executed (e.g., by container engine 160) on a computing device 120. For example, after receiving the first container image 134A from the image repository 130, the first container image 134A may be loaded for execution by the container engine 160. As part of executing the first container image 134A, the first container image 134A may be analyzed by the container engine 160 to determine if an application layer (e.g., layer 213) of the first container image 134A is compatible with different layers than those present in the first container image 134A such that the layers can be replaced. For example, it may be determined that the first container image 134A has a first base OS layer 210A and an application layer 213. The first base OS layer 210A may include a first OS component 220A. It may be further determined that the application layer 213 is compatible with a second base OS layer 210B that is different than the first base OS layer 210A. The second base OS layer 210B may include a second OS component 220B. In some embodiments, determining that the second base OS layer 210B is compatible with the application layer 213 may include determining that each of the layers 213, 212, 211 of the first container image 134A will run successfully and without error when combined with the second base OS layer 210B.

Responsive to this determination, a second container image 134B may be generated in which the first base OS layer 210A is replaced with the second base OS layer 210B. In some embodiments, the second container image 134B may be generated prior to the execution of the first container image 134A (e.g., by the container engine 160). In some embodiments, the second container image 134B and/or the first container image 134A may be stored within the memory 124 of the computing device 120 while being executed by the container engine 160, but the embodiments of the present disclosure are not limited thereto.

Figure 5D:
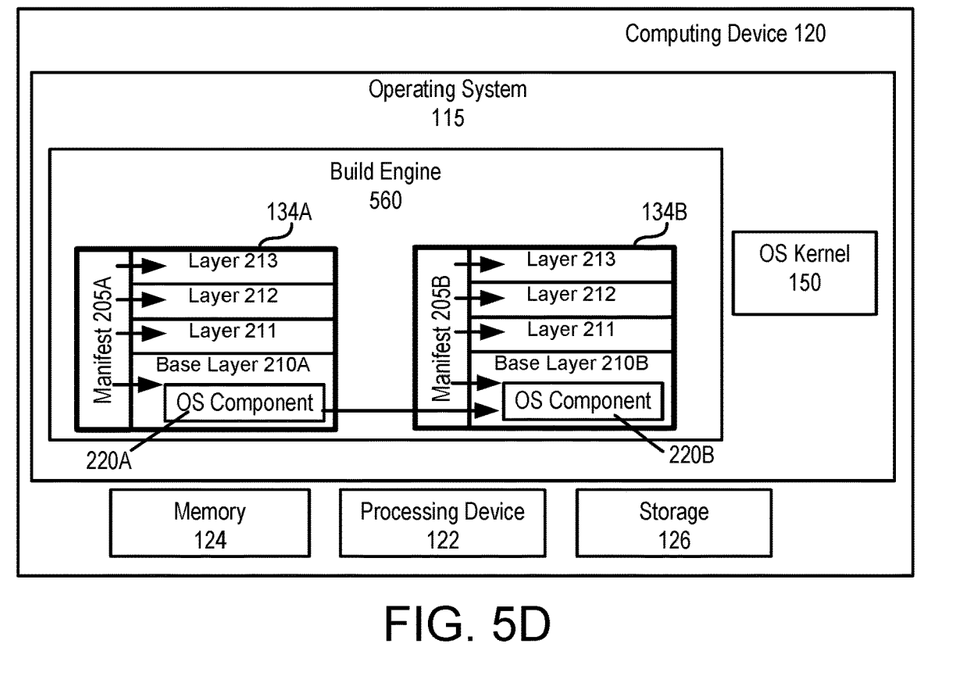

Referring to FIG. 5D, in some embodiments a second, compatible, container image 134B may be generated from a first container image 134A during the build of the first container image 134A. For example, a build engine 560 may be executed by an operating system 115 of the computing device 120. The build engine 560 may be configured to collect the components of the first container image 134A. For example, the build engine 560 may compile and/or collect a container application 118 (see FIG. 1B) as well as any supporting objects 230 and a first OS component 220A, and construct the various layers 210, 211, 212, 213 of the first container image 134A. In some embodiments, the build engine 560 may construct the first container image 134A according to a set of build instructions and/or manifest. During construction of the first container image 134A, it may be determined that the first container image 134A has a first base OS layer 210A and an application layer 213. The first base OS layer 210A may include a first OS component 220A. The build engine 560 may further determine that the application layer 213 is compatible with a second base OS layer 210B that is different than the first base OS layer 210. The second base OS layer 210B may include a second OS component 220B. In some embodiments, determining that the second base OS layer 210B is compatible with the application layer 213 may include determining that each of the layers 213, 212, 211 of the first container image 134A will run successfully and without error when combined with the second base OS layer 210B.

Responsive to this determination, a second container image 134B may be generated by the build engine 560 in which the first base OS layer 210A is replaced with the second base OS layer 210B. In some embodiments, the second container image 134B may replace the first container image 134A. For example, even though the instructions for the build engine 560 may indicate that the first OS component 220A and the first base OS layer 210A are to be used, the build engine 560 may override the specifications for the first container image 134A and use the second base OS layer 210B responsive to determining that the second base OS layer 210B is compatible with the application layer 213. In some embodiments, both the first container image 134A and the second container image 134B may be generated by the build engine 560.

Figure 6:
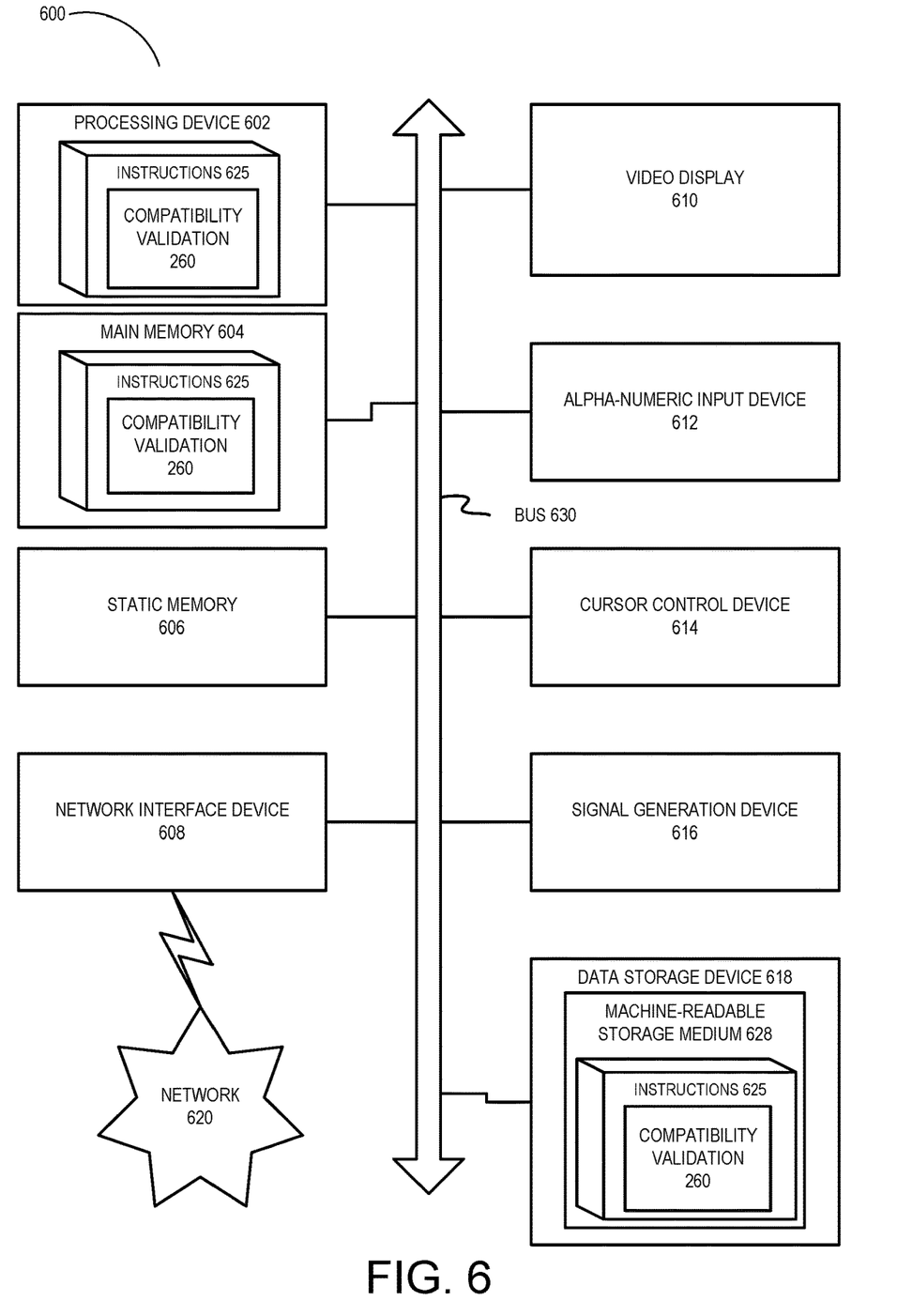
FIG. 6 is a block diagram that illustrates an example system, according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a component (e.g., compatibility validation component 260, container engine 160, and/or build engine 560 discussed herein) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "generating," "examining," "downloading," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a container image, the container image comprising a container manifest referencing a first base operating system layer and an application layer;
   determining, by a processing device, an execution compatibility between the application layer and a second base operating system layer, different from the first base operating system layer, wherein determining the execution compatibility between the application layer and the second base operating system layer comprises determining that the application layer will execute successfully and without error when combined with the second base operating system layer; and
   responsive to determining the execution compatibility between the application layer and the second base operating system layer, generating an updated container image, an updated container manifest, or the updated container image and the updated container manifest in which the first base operating system layer is replaced with the second base operating system layer.

2. The method of claim 1, wherein the container image comprises a plurality of layers, one of which is the first base operating system layer.

3. The method of claim 2, wherein determining the execution compatibility between the application layer and the second base operating system layer comprises examining metadata of one or more of the plurality of layers.

4. The method of claim 1, wherein receiving the container image comprises downloading the container image from an image repository.

5. The method of claim 1, wherein the first base operating system layer comprises a first operating system component that is different from a second operating system component of the second base operating system layer.

6. The method of claim 1, wherein determining the execution compatibility between the application layer and the second base operating system layer is performed upon the container image at an image repository of a plurality of container images, is performed upon the container image responsive to downloading the container image from the image repository, or is performed when building the container image.

7. The method of claim 1, wherein determining that the application layer will execute successfully and without error when combined with the second base operating system layer comprises confirming an application programming interface utilized by the application layer is present in the second base operating system layer and accepts the identical number and types of input.

8. A system comprising:
a memory; and
a processing device, operatively coupled to the memory, to:
receive a container image, the container image comprising a container manifest referencing a first base operating system layer and an application layer;
determine an execution compatibility between the application layer and a second base operating system layer, different from the first base operating system layer, wherein, to determine the execution compatibility between the application layer and the second base operating system layer, the processing device is to determine that the application layer will execute successfully and without error when combined with the second base operating system layer; and
responsive to determining the execution compatibility between the application layer and the second base operating system layer, generate an updated container image, an updated container manifest, or the updated container image and the updated container manifest in which the first base operating system layer is replaced with the second base operating system layer.

9. The system of claim 8, wherein the container image comprises a plurality of layers, one of which is the first base operating system layer.

10. The system of claim 9, wherein, to determine the execution compatibility between the application layer and the second base operating system layer, the processing device is to examine metadata of one or more of the plurality of layers.

11. The system of claim 8, wherein, to receive the container image, the processing device is to download the container image from an image repository.

12. The system of claim 8, wherein the first base operating system layer comprises a first operating system component that is different from a second operating system component of the second base operating system layer.

13. The system of claim 8, wherein determining the execution compatibility between the application layer and the second base operating system layer is performed upon the container image at an image repository of a plurality of container images, is performed upon the container image responsive to downloading the container image from the image repository, or is performed when building the container image.

14. The system of claim 8, wherein, to determine that the application layer will execute successfully and without error when combined with the second base operating system layer, the processing device is to confirm an application programming interface utilized by the application layer is present in the second base operating system layer and accepts the identical number and types of input.

15. A non-transitory computer-readable storage medium including instructions that, when executed by a processing device, cause the processing device to:
receive a container image, the container image comprising a container manifest referencing a first base operating system layer and an application layer;
determine, by the processing device, an execution compatibility between the application layer and a second base operating system layer, different from the first base operating system layer, wherein, to determine the execution compatibility between the application layer and the second base operating system layer, the processing device is to determine that the application layer will execute successfully and without error when combined with the second base operating system layer; and
responsive to determining the execution compatibility between the application layer and the second base operating system layer, generate an updated container image, an updated container manifest, or the updated container image and the updated container manifest in which the first base operating system layer is replaced with the second base operating system layer.

16. The non-transitory computer-readable storage medium of claim 15, wherein the container image comprises a plurality of layers, one of which is the first base operating system layer.

17. The non-transitory computer-readable storage medium of claim 16, wherein, to determine the execution compatibility between the application layer and the second base operating system layer, the processing device is to examine metadata of one or more of the plurality of layers.

18. The non-transitory computer-readable storage medium of claim 15, wherein the first base operating system layer comprises a first operating system component that is different from a second operating system component of the second base operating system layer.

19. The non-transitory computer-readable storage medium of claim 15, wherein determining the execution compatibility between the application layer and the second base operating system layer is performed upon the container image at an image repository of a plurality of container images, is performed upon the container image responsive to downloading the container image from the image repository, or is performed when building the container image.

20. The non-transitory computer-readable storage medium of claim 15, wherein, to determine that the application layer will execute successfully and without error when combined with the second base operating system layer, the processing device is to confirm an application programming interface utilized by the application layer is present in the second base operating system layer and accepts the identical number and types of input.

* * * * *

UNITED STATES PATENT AND TRADEMARK OFFICE
CERTIFICATE OF CORRECTION

| | | |
|---|---|---|
| PATENT NO. | : 11,983,525 B2 | Page 1 of 1 |
| APPLICATION NO. | : 17/851923 | |
| DATED | : May 14, 2024 | |
| INVENTOR(S) | : Gabriel Zvi BenHanokh et al. | |

It is certified that error appears in the above-identified patent and that said Letters Patent is hereby corrected as shown below:

In the Specification

In Column 6, Line 54, please replace "FIGS. 1A and 1" with -- FIGS. 1A and 1B --.

In Column 7, Line 42, please replace "generated" with -- generate --.

In Column 8, Line 66, please replace "210, 211, 211, 213" with -- 210, 211, 212, 213 --.

In Column 9, Line 4, please replace "210, 211, 211, 213" with -- 210, 211, 212, 213 --.

In Column 9, Line 15, please replace "118 is has" with -- 118 has --.

In Column 12, Line 62, please replace "replace the" with -- to replace the --.

Signed and Sealed this
Sixth Day of May, 2025

Coke Morgan Stewart
*Acting Director of the United States Patent and Trademark Office*